Dec. 17, 1968  E. A. SMELOFF ET AL  3,416,159
DOUBLE-CAGE HEART VALVE WITH CONTOURED OVERSIZE ORIFICE
Filed May 24, 1965
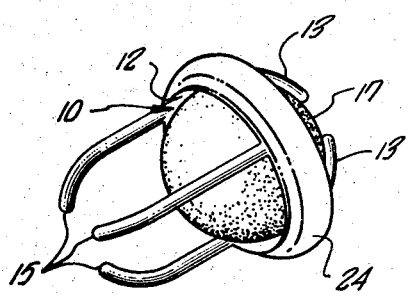
FIG_1_
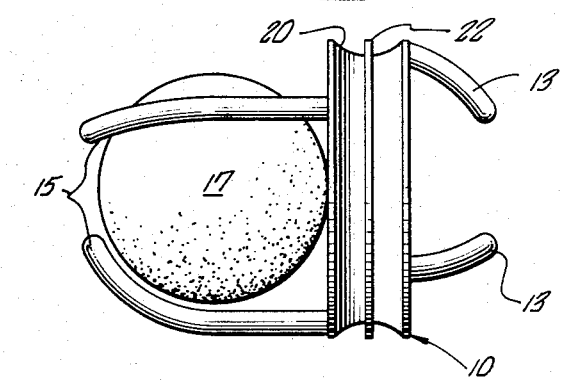
FIG_2_
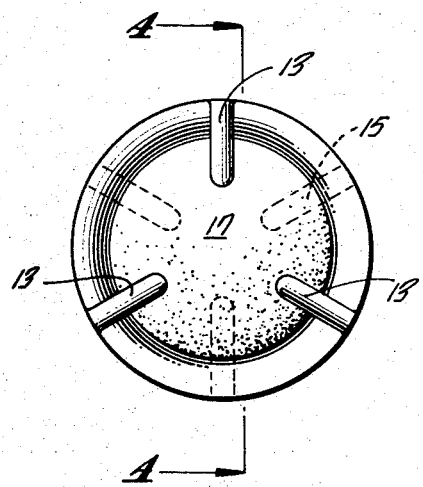
FIG_3_
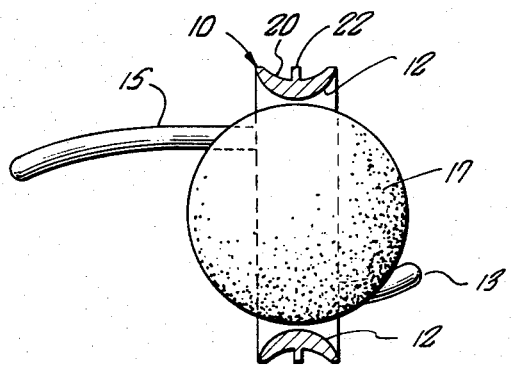
FIG_4_
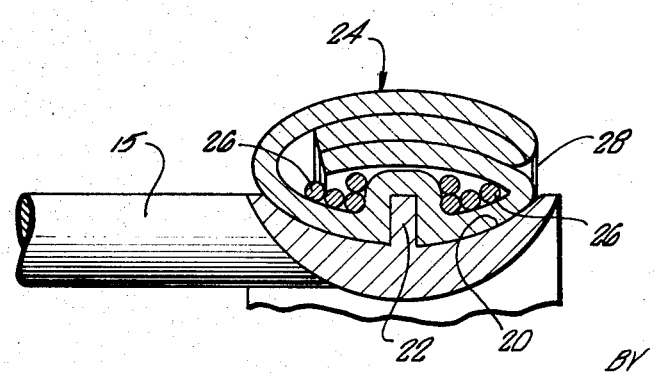
FIG_5_
INVENTORS.
EDWARD A. SMELOFF
TREVOR B. DAVEY
BORIS KAUFMAN
BY Christie, Parker and Hale
ATTORNEYS.

United States Patent Office 3,416,159
Patented Dec. 17, 1968

3,416,159
DOUBLE-CAGE HEART VALVE WITH
CONTOURED OVERSIZE ORIFICE
Edward A. Smeloff, Sacramento, Trevor B. Davey, Carmichael, and Boris Kaufman, Sacramento, Calif., assignors to Sutter Hospital Medical Research Foundation, Sacramento, Calif., a corporation of California
Filed May 24, 1965, Ser. No. 458,074
15 Claims. (Cl. 3—1)

ABSTRACT OF THE DISCLOSURE

A heart valve with an annular valve body defining an orifice and having a plurality of struts forming a pair of cages on opposite sides of the orifice. A spherical closure member is captively held within the cages, and is moved by blood flow between open and closed positions in check-valve fashion. A slight leak or backflow is provided in the closed position by making the orifice slightly larger than the closure member. Blood flow is maximized in the open position of the valve by providing an inwardly convex contour on the orifice-defining surfaces of the body. An annular rib is formed in a channel around the periphery of the valve body to anchor a suture ring used to secure the valve within a heart.

Background of the invention

This invention relates to an improved heart valve for surgical installation in a patient having a defective natural heart valve.

Several different types of artificial heart valves have been developed for replacement of natural valves having congenital defects or exhibiting malfunctions due to heart disease. While the implantation of such valves has often been successful, they exhibit a higher impedance to blood flow than that presented by a natural valve, and also tend to reduce total flow by inducing turbulence in the bloodstream adjacent the valve.

The improved heart valve of this invention overcomes the deficiencies of earlier valves by incorporating a valve orifice of such curvature that total flow for a given blood pressure is increased. The improved heart valve includes a novel suture-ring retaining rib which permits the valve orifice to occupy a larger percentage of the total valve cross-sectional area than was possible in earlier designs. Stated another way, for any given outside diameter of a suture ring used to secure the valve to the patient's heart, the improvement of this invention provides a larger valve orifice area and hence permits a greater total flow.

Briefly stated, the improved heart valve comprises an annular valve body having an inner wall which defines a valve orifice. The inner wall has an inwardly convex cross section, the ratio of the radius of curvature of this inner wall to the diameter of the orifice being at least 0.1. A movable, flow-actuated valve closure member is positioned adjacent the orifice by means secured to the valve body.

In a preferred form of the invention, the outer surface of the valve body has an annular groove to receive a suture ring for securing the valve within the patient's heart. An annular rib is disposed in the groove, the rib being secured to and extending radially from the outer surface of the valve body. The rib retains the suture ring in the annular groove, and permits the groove to be quite shallow, thereby increasing the allowable orifice size for any given outside diameter of the valve body.

The valve body and closure member form the equivalent of a check valve which is opened by blood flow in one direction and closed by blood flow in the opposite direction. The closure member is preferably slightly smaller in diameter than the inside diameter of the orifice, permitting a small amount of flow or "leakage" even when the valve is closed. This slight flow reduces the tendency for blood clots to form around the suture ring, and also lessens the probability of damage to blood cells which can occur in a tightly seating valve.

These and other aspects of the invention will be further described with reference to the attached drawings.

FIG. 1 is a perspective view of the heart valve of this invention, with the valve shown in a closed position;
FIG. 2 is a side elevation of the heart valve shown in an open position and without a suture ring;
FIG. 3 is an end view of the valve shown in FIG. 2;
FIG. 4 is a view taken on line 4—4 of FIG. 3; and
FIG. 5 is an enlarged cross section of the suture-ring groove, showing one style of suture ring secured in place.

Referring to the drawings, an annular valve body 10 is provided with an inwardly convex inner wall 12 forming the valve orifice. Secured to one side of the valve body are a plurality of short, inwardly curved struts 13 forming a cage on the inlet side of the valve. Three such struts 13 are typically spaced at 120° intervals around the valve body. Secured to the opposite or outlet side of the valve body are a plurality of elongated struts 15 which first extend parallel to the axis of the annular valve body, and then curve inwardly at their ends toward the axis. Three such struts are typically secured at 120° intervals around the valve body, forming a cage on the outlet side of the valve.

Disposed within the cages formed by struts 13 and 15 is a valve closure member 17 which is preferably spherical. The diameter of the closure member is slightly smaller than the diameter of the valve orifice, permitting the closure member to roll freely between the limits imposed by the two cages.

Referring to FIG. 4, the cross-sectional shape of the inner wall 12 is formed as an inwardly convex curve. The radius of curvature of this surface is chosen to be at least one-tenth the minimum diameter of the valve orifice. We have found that total flow through this orifice can be increased by 20% or more, for a given blood pressure, over the flow through a conventional orifice having a cross section either of small radius of curvature or of angularly intersecting flat surfaces.

Valve efficiency can be further improved by increasing the ratio of this radius of curvature to the orifice diameter up to a limit of about 0.5. However, this ratio is generally confined to the range of 0.1 to approximately 0.3 to keep the width of the valve body within practical limits.

The term "radius of curvature" is used in this application in its generally accepted sense as meaning the reciprocal of the "curvature" at a point on a curve. "Curvature" is also used in its usual sense as meaning the rate of change of direction of the curve.

The outer surface of the valve body is formed with an annular groove 20. An annular rib 22 is disposed in the center of this groove. A suture ring 24 is disposed in the groove on either side of the rib. The suture ring is secured in place with a wrapping thread or wire or by any other conventional means.

For example, FIG. 5 shows a suture ring 24 formed from several folded layers of flat material and secured within groove 20 by several wrappings of thread or wire 26. Adjacent folds of the suture ring are secured together by stitches 28 or any other conventional means.

The purpose of rib 22 is to prevent the suture ring from sliding longitudinally along the valve body. The rib permits groove 20 to be quite shallow, maximizing the percentage of total valve area occupied by the valve orifice. Flow is thereby increased, and the amount of turbulence-inducing structure disposed in the bloodstream is minimized.

In a preferred form, the valve body, annular rib and struts are integrally formed from a single piece of titanium. This material has proved especially suitable as it is lightweight, machinable, and essentially inert when implanted in the patients body. A silicon-rubber material such as "Silastic" is satisfactory for the valve closure member. A conventional suture material such as Dacron is suitable for the suture ring.

We claim:

1. A heart valve, comprising an annular valve body having an inner wall defining a valve orifice, the inner wall having an inwardly convex cross section, the ratio of the inner wall radius of curvature to the orifice diameter being at least 0.1, attachment means on the valve body for securing the member within a heart, a flow-actuated valve closure member, and means secured to the valve body for positioning the closure member to be movable between an open position remote from the orifice and a closed position within the orifice and immediately adjacent a portion of the inner wall to substantially close the valve, the inner-wall portion being of unbroken inward convexity.

2. A heart valve, comprising an annular valve body having an inner wall defining a valve orifice, the inner wall having an inwardly convex cross section, the ratio of the inner wall radius of curvature to the orifice diameter being in the range of about 0.1 to about 0.3, attachment means on the valve body for securing the member within a heart, a flow-acuated valve closure member, and means secured to the valve body for positioning the closure member to be movable between an open position remote from the orifice and a closed position within the orifice and immediately adjacent a portion of the inner wall to substantially close the valve, the inner-wall portion being of unbroken inward convexity.

3. A heart valve, comprising an annular valve body having an inner wall defining a circular valve orifice, the inner wall having an inwardly convex cross section, the ratio of the inner wall radius of curvature to the orifice diameter being at least 0.1, attachment means on the valve body for securing the member within a heart, a flow-actuated, spherical valve-closure member, and means secured to the valve body for positioning the closure member to be movable between an open position remote from the orifice and a closed position within the orifice and immediately adjacent a portion of the inner wall to substantially close the valve, the inner-wall portion being of unbroken inward convexity.

4. A heart valve, comprising an annular valve body having an inner wall defining a circular valve orifice, the inner wall having an inwardly convex cross section, the ratio of the inner wall radius of curvature to the orifice diameter being at least 0.1, a flow-actuated, spherical valve-closure member having a diameter slightly smaller than the orifice diameter whereby a slight flow can be maintained when the valve is closed, and means secured to the valve body for positioning the closure member adjacent and in movable relation to the orifice.

5. A heart valve, comprising an annular valve body having an inner wall defining a valve orifice, the inner wall having an inwardly convex cross section, the ratio of the inner wall radius of curvature to the orifice diameter being at least 0.1; the valve body having an outer surface having an annular groove to receive a suture ring for securing the valve within a heart; an annular rib disposed in the groove, the rib being secured to and extending radially from the valve body outer surface; a suture ring disposed around the valve body in the annular groove and in direct contact with the annular rib to be anchored against longitudinal sliding; a flow-actuated valve closure member; and means secured to the valve body for positioning the closure member adjacent and in movable relation to the orifice.

6. A heart valve, comprising an annular valve body having an inner wall defining a valve orifice, the valve body haing an outer surface having an annular groove to receive a suture ring for securing the valve within a heart; an annular rib disposed in the groove, the rib being secured to and extending radially from the valve body outer surface; a suture ring disposed around the valve body in the annular groove and in direct contact with the annular rib to be anchored against longitudinal sliding; a flow-actuated valve closure member; and means secured to the valve body for positioning the closure member adjacent and in movable relation to the orifice.

7. A heart valve, comprising an annular valve body having an inner wall defining a valve orifice; a flow-activated, valve-closure member of a size slightly smaller than the orifice whereby a slight flow can be maintained when the valve is closed; and inwardly curved independent struts secured to the valve body on both sides of the valve orifice for positioning the closure member adjacent and in movable relation to the orifice.

8. A heart valve, comprising an annular valve body having an inner wall defining a circular valve orifice, the valve body having an outer surface having an annular groove to receive a suture ring for securing the valve within a heart; a flow-activated, spherical valve-closure member having a diameter slightly smaller than the orifice diameter whereby a slight flow can be maintained when the valve is closed; and inwardly curved independent struts secured to the valve body on both sides of the valve orifice for positioning the closure member adjacent and in movable relation to the orifice.

9. A heart valve, comprising an annular valve body having an inner wall defining a valve orifice, the valve body having an outer surface having an annular groove to receive a suture ring for securing the valve within a heart; an annular rib disposed in the groove, the rib being secured to and extending radially from the valve body outer surface; a flow-activated, spherical valve-closure member having a diameter slightly smaller than the orifice diameter whereby a slight flow can be maintained when the valve is closed; and inwardly curved independent struts secured to the valve body on both sides of the valve orifice for positioning the closure member adjacent and in movable relation to the orifice.

10. A heart valve, comprising an annular valve body having an inner wall defining a valve orifice, the valve body having an outer surface having an annular groove to receive a suture ring for securing the valve within a heart; an annular rib disposed in the groove, the rib being secured to and extending radially from the valve body outer surface; a flow-activated, spherical valve-closure member having a diameter slightly smaller than the orifice diameter whereby a slight flow can be maintained when the valve is closed; inwardly curved independent short struts forming a cage and secured to the inlet side of the valve body for positioning the closure member in a closed position; and inwardly curved independent elongated struts forming a cage and secured to the outlet side of the valve body for positioning the closure member in an open position.

11. A heart valve, comprising an annular valve body having an inner wall defining a valve orifice, the inner wall having an inwardly convex cross section, the ratio of the inner wall radius of curvature to the orifice diameter being at least 0.1; a flow-activated, spherical valve-closure member having a diameter slightly smaller than the orifice diameter whereby a slight flow can be maintained when the valve is closed; and inwardly curved independent struts secured to the valve body on both sides of the valve orifice for positioning the closure member adjacent and in movable relation to the orifice.

12. A heart valve, compising an annular valve body having an inner wall defining a valve orifice, the inner wall having an inwardly convex cross section, the ratio of the inner wall radius of curvature to the orifice diameter being in the range of about 0.1 to about 0.3; a flow-activated, spherical valve-closure member having a diameter slightly smaller than the orifice diameter whereby a slight flow can be maintained when the valve is closed; inwardly curved independent short struts forming a cage and secured to the inlet side of the valve body for positioning the closure member in the closed position; and inwardly curved independent elongated struts forming a cage and secured to the outlet side of the valve body for positioning the closure member in the open position.

13. A heart valve, comprising an annular valve body having an inner wall defining a valve orifice, the inner wall having an inwardly convex cross section, the ratio of the inner wall radius of curvature to the orifice diameter being at least 0.1, the valve body having an outer surface having an annular groove to receive a suture ring for securing the valve within a heart; an annular rib disposed in the groove, the rib being secured to and extending radially from the valve body outer surface; a flow-activated, spherical valve-closure member having a diameter slightly smaller than the orifice diameter whereby a slight flow can be maintained when the valve is closed; and inwardly curved independent struts secured to the valve body on both sides of the valve orifice for positioning the closure member adjacent and in movable relation to the orifice.

14. A heart valve, comprising an annular valve body having an inner wall defining a circular valve orifice, the inner wall having an inwardly convex cross section, the ratio of the inner wall radius of curvature to the orifice diameter being in the range of about 0.1 to about 0.3; the valve body having an outer surface having an annular groove to receive a suture ring for securing the valve within a heart; an annular rib disposed in the groove, the rib being secured to and extending radially from the valve body outer surface; a suture ring disposed around the valve body in the annular groove and engaged with the annular rib; a flow-activated, spherical valve-closure member having a diameter slightly smaller than the orifice diameter whereby a slight flow can be maintained when the valve is closed; inwardly curved independent short struts forming a cage and secured to the inlet side of the valve body for positioning the closure member in the closed position, the ends of the short struts away from the valve body being spaced apart; and inwardly curved independent elongated struts forming a cage and secured to the outlet side of the valve body for positioning the closure member in the open position, the ends of the elongated struts away from the valve body being spaced apart.

15. A heart valve, comprising an annular valve body having an inner wall defining a valve orifice with an inlet side and an outlet side, a suture ring secured to the valve body for attaching the valve within a heart, means secured to and extending from the valve body to define a cage, and a flow-actuated valve closure member captively positioned in the cage and movable between an open position in which the member is displaced from the valve orifice and a closed position in which the member is disposed in the orifice, the cage means being arranged to support the member to be slightly spaced from the inner wall of the valve body when the member is in the closed position whereby a slight backflow occurs through the orifice when the valve is closed.

References Cited

UNITED STATES PATENTS

| | | | |
|---|---|---|---|
| 1,935,978 | 11/1933 | Harbison | 137—533.13 |
| 3,325,827 | 6/1967 | Edwards | 3—1 |

OTHER REFERENCES

Seidel: German printed application, 1,180,087, October 1964.

"Combined Aortic and Mitral Valve Replacement": by R. S. Cartwright et al., Journal of Thoracic and Cardiovascular Surgery, vol. 45, No. 1, 3–1 HV, January 1963, pp. 35–46.

"Sutureless Prosthetic Heart Valves": by G. J. Magovern et al., Journal of Thoracic and Cardiovascular Surgery, vol. 46, No. 6, 3–1 HV, December 1963, pp. 726–736.

"A Sac Type of Artificial Heart Inside the Chest of Dogs" by T. Akutsu et al., Journal of Thoracic and Cardiovascular Surgery, vol. 47, No. 4, 128 H–L Digest, April 1964, pp. 512–527.

RICHARD A. GAUDET, *Primary Examiner.*

R. L. FRINKS, *Assistant Examiner.*

U.S. Cl. X.R.

137—513.5, 533.11

Disclaimer 3,416,159.—*Edward A. Smeloff*, Sacramento, *Trevor B. Davey*, Carmichael, and *Boris Kaufman*, Sacramento, Calif. DOUBLE-CAGE HEART VALVE WITH CONTOURED OVERSIZE ORIFICE. Patent dated Dec. 17, 1968. Disclaimer filed Sept. 3, 1974, by the assignee, *Sutter Hospitals Medical Research Foundation*.

Hereby enters this disclaimer to claims 7, 8 and 15 of said patent.

[*Official Gazette May 6, 1975.*]